US010536922B2

(12) United States Patent
Yoon

(10) Patent No.: US 10,536,922 B2
(45) Date of Patent: Jan. 14, 2020

(54) TERMINAL DEVICE, ELECTRONIC DEVICE AND CONTROL METHOD FOR DETERMINING THE POSITION OF SEARCHING OBJECT DEVICE

(71) Applicant: Samsung Electronics Co., Ltd., Suwon-si, Gyeonggi-do (KR)

(72) Inventor: Chang-bae Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/837,794

(22) Filed: Dec. 11, 2017

(65) Prior Publication Data
US 2018/0176879 A1 Jun. 21, 2018

(30) Foreign Application Priority Data
Dec. 16, 2016 (KR) .......................... 10-2016-0172850

(51) Int. Cl.
*H04L 29/08* (2006.01)
*H04W 64/00* (2009.01)
*H04W 4/70* (2018.01)

(52) U.S. Cl.
CPC .......... *H04W 64/003* (2013.01); *H04L 67/18* (2013.01)

(58) Field of Classification Search
CPC ... H04W 88/02; H04W 88/06; H04W 64/003; H04W 4/70; H04L 67/18
See application file for complete search history.

(56) References Cited

U.S. PATENT DOCUMENTS

| 8,965,400 | B2 | 2/2015 | Kang et al. | |
|---|---|---|---|---|
| 9,794,753 | B1* | 10/2017 | Stitt | ..................... H04B 17/318 |
| 2013/0142059 | A1* | 6/2013 | Di Girolamo | .......... H04L 12/66 370/252 |
| 2014/0070919 | A1* | 3/2014 | Jackson | ................. G08C 17/02 340/5.61 |
| 2015/0019717 | A1* | 1/2015 | Li | ....................... H04L 67/1085 709/224 |

(Continued)

FOREIGN PATENT DOCUMENTS

| CN | 105515834 A | 4/2016 |
|---|---|---|
| JP | 2006-115099 A | 4/2006 |

(Continued)

OTHER PUBLICATIONS

European Search Report dated Sep. 3, 2019, issued in European Patent Application No. 17881423.2.

*Primary Examiner* — Asghar H Bilgrami
(74) *Attorney, Agent, or Firm* — Jefferson IP Law, LLP

(57) ABSTRACT

A controlling method of an electronic device is provided. The method includes receiving a search request for a searching object device from a terminal device, broadcasting a pre-defined search signal in response to the search request, in response to a response signal being received from an external device in response to the pre-defined search signal, analyzing a pattern of the received response signal and determining whether the external device is the searching object device, and in response to the external device being determined as the searching object device, transmitting intensity information of the received response signal to the terminal device to determine a position of the external device which is determined as the searching object device.

17 Claims, 12 Drawing Sheets

(56) References Cited

U.S. PATENT DOCUMENTS

| | | | | |
|---|---|---|---|---|
| 2015/0351204 A1* | 12/2015 | Hershberg | ......... | H05B 37/0272 |
| | | | | 315/153 |
| 2015/0358777 A1* | 12/2015 | Gupta | ................. | H04L 12/2807 |
| | | | | 370/254 |
| 2015/0358778 A1* | 12/2015 | Heo | ...................... | H04W 4/029 |
| | | | | 455/456.6 |
| 2015/0365787 A1* | 12/2015 | Farrell | ................... | H04W 4/02 |
| | | | | 455/456.1 |
| 2016/0029195 A1* | 1/2016 | Leahy | .................... | H04W 4/90 |
| | | | | 455/404.2 |
| 2016/0105814 A1* | 4/2016 | Hurst | ................... | H04W 12/08 |
| | | | | 370/252 |
| 2016/0150057 A1 | 5/2016 | Men et al. | | |
| 2016/0156723 A1 | 6/2016 | Seo et al. | | |
| 2016/0241994 A1 | 8/2016 | Iguchi et al. | | |
| 2016/0261462 A1 | 9/2016 | Green et al. | | |
| 2017/0156038 A1 | 6/2017 | Chen et al. | | |
| 2017/0272317 A1* | 9/2017 | Singla | ................. | H04L 41/0806 |
| 2018/0091965 A1* | 3/2018 | Watson | ................... | H04W 4/80 |

FOREIGN PATENT DOCUMENTS

| | | |
|---|---|---|
| KR | 10-2003-0062065 A | 7/2003 |
| KR | 10-1023321 B1 | 3/2011 |
| KR | 10-1182726 B1 | 9/2012 |
| KR | 10-1298741 B1 | 8/2013 |
| KR | 10-1358690 B1 | 2/2014 |
| KR | 10-2016-0023241 A | 3/2016 |

\* cited by examiner

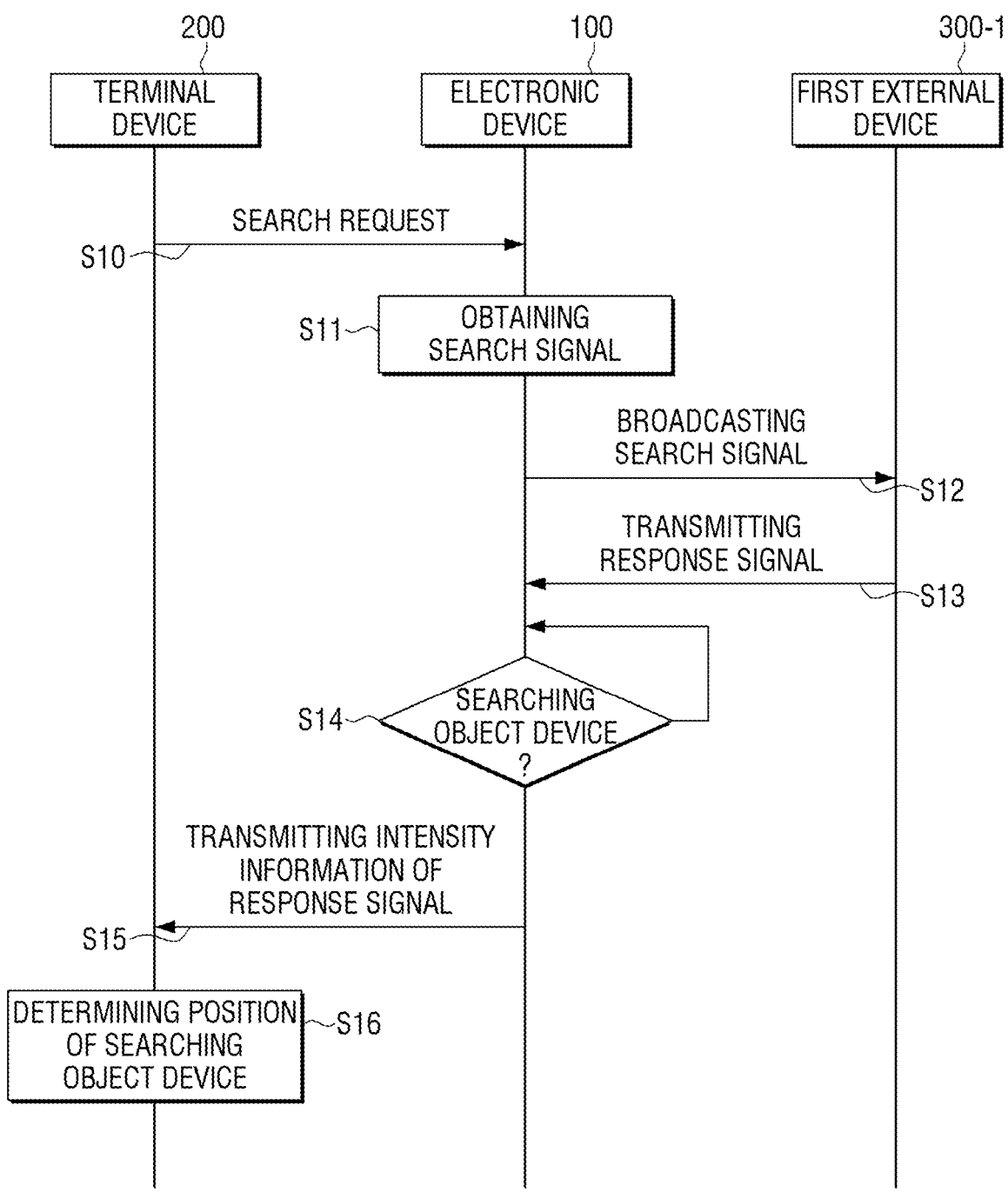

TERMINAL DEVICE, ELECTRONIC DEVICE AND CONTROL METHOD FOR DETERMINING THE POSITION OF SEARCHING OBJECT DEVICE

CROSS-REFERENCE TO RELATED APPLICATION(S)

This application claims the benefit under 35 U.S.C. § 119(a) of a Korean patent application filed on Dec. 16, 2016 in the Korean Intellectual Property Office and assigned Serial number 10-2016-0172850, the entire disclosure of which is hereby incorporated by reference.

TECHNICAL FIELD

The present disclosure relates to a terminal device, an electronic device, and a control method for determining a position of a searching object device. More particularly, the present disclosure relates to a terminal device, an electronic device, and a control method for determining a position of a searching object device using a heterogeneous communication protocol.

BACKGROUND

Recently, with the development of Internet communication, there has been an increasing interest in internet of things (IOT) service for exchanging information between electronic devices through wire/wireless Internet and research thereof has been actively performed. Therefore, a recently developed or released electronic device may share information between electronic devices with the support of communication module, platform and service for the IOT service.

However, an electronic device for which the communication module, the platform and the service for the IOT service are not supported, that is, an electronic device that is out of date, may not provide the IOT service.

In addition, in order to use the IOT service through a recently released electronic device in support of the IOT service, the same communication protocol may be used for the IOT service between electronic devices.

In other words, in the case where the heterogeneous communication protocol is used, which means that electronic devices capable of providing the IOT service use different communication protocols, the IOT service between the electronic devices may not be provided.

Therefore, a need exists for various IOT services with an electronic device using a heterogeneous communication protocol.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide various internet of things (IOT) services with an electronic device using a heterogeneous communication protocol.

Another aspect of the present disclosure is to provide to a position of a searching object device requested by a user with an electronic device using a heterogeneous communication protocol.

Another aspect of the present disclosure is to provide a position of a searching object device recognized by an electronic device using a heterogeneous communication protocol.

In accordance with an aspect of the present disclosure, a controlling method of an electronic device is provided. The method includes receiving a search request for a searching object device from a terminal device, broadcasting a pre-defined search signal in response to the search request, in response to a response signal being received from an external device in response to the pre-defined search signal, analyzing a pattern of the received response signal and determining whether the external device is the searching object device, and in response to the external device being determined as the searching object device, transmitting intensity information of the received response signal to the terminal device to determine a position of the external device which is determined as the searching object device.

The electronic device may perform communication by using a first communication protocol, and the external device which is determined as the searching object device may perform communication by using a second communication protocol different from the first communication protocol.

In response to a search request being received for the searching object device which performs communication by using the second communication protocol, the broadcasting of the search signal may include broadcasting a pre-stored search signal related to the second communication protocol, and the response signal may be a signal received from at least one external device which performs communication by using the second communication protocol.

The broadcasting of the search signal may include, in response to a search request including device type information of the searching object device which performs communication by using the second communication protocol being received, broadcasting a pre-stored search signal related to the device type information based on the search request, and the response signal may be a signal received from at least one external device related to the device type information, among external devices which perform communication by using the second communication protocol.

The broadcasting of the search signal may include, in response to a search request including device type information and identification information of the searching object device which performs communication by using the second communication protocol being received, broadcasting a pre-stored search signal related to the device type information and the identification information based on the search request, and the response signal may be a signal received from an external device related to the device type information and the identification information, among external devices which perform communication by using the second communication protocol.

The first communication protocol and the second communication protocol may use a same frequency band.

The terminal device may receive intensity information of a plurality of response signals received from the external device which is determined as the searching object device from a plurality of electronic devices, and determine a position of the external device determined as the searching object device based on the intensity information of the plurality of response signals.

In accordance with an aspect of the present disclosure, a controlling method of a terminal device operable in association with a plurality of electronic devices for determining a position of a searching object device is provided. The method includes transmitting a search request for the searching object device to the plurality of electronic devices, receiving intensity information of response signals of the searching object device which are received from the plurality of electronic devices in response to the search request, and determining a position of the searching object device based on the intensity information of the response signals.

The method may further include receiving image data of an area where the searching object device is disposed from at least one capturing device, and displaying the position of the searching object device based on the image data and the determined position.

The method may further include transmitting position information of the searching object device to an external user terminal, and the external user terminal may display the position of the searching object device based on the position information.

The plurality of electronic devices may perform communication by using a first communication protocol, the searching object device may perform communication by using a second communication protocol different from the first communication protocol, and the transmitting of the search request may include transmitting a search request for the searching object device which performs communication by using the second communication protocol to the plurality of electronic devices in response to a first searching command, transmitting a search request including device type information for the searching object device which performs communication by using the second communication protocol to the plurality of electronic devices in response to a second searching command, and transmitting a search request including device type information and identification information for the searching object device which performs communication by using the second communication protocol to the plurality of electronic devices in response to a third searching command.

In accordance with an aspect of the present disclosure, an electronic device is provided. The electronic device includes a communicator configured to receive a search request for a searching object device by performing data communication with a terminal device and broadcast a pre-stored search signal in response to the search request, and at least one processor configured to, in response to a response signal being received from an external device through the communicator in response to the pre-stored search signal, determine whether the external device is the searching object device by analyzing a pattern of the received response signal, and in response to determining that the external device is the searching object device, control the communicator to transmit intensity information of the received response signal to the terminal device to determine a position of the external device which is determined as the searching object device.

The communicator may perform data communication with a paired terminal device by using a first communication protocol and transmit the search signal for the search request in a broadcasting method, and the external device determined as the searching object device may perform communication by using a second communication protocol different from the first communication protocol.

The at least one processor, in response to the search request for the searching object device which performs communication by using the second communication protocol being received, may control the communicator to broadcast the pre-stored search signal related to the second communication protocol, and the response signal may be a signal received from at least one external device which performs communication by using the second communication protocol.

The at least one processor, in response to a search request including device type information for the searching object device which performs communication by using the second communication protocol being received, may control the communicator to broadcast the pre-stored search signal related to the device type information based on the search request, and the response signal may be a signal received from at least one external device related to the device type information, among external devices which perform communication by using the second communication protocol.

The at least one processor, in response to a search request including device type information and identification information for the searching object device which performs communication by using the second communication protocol being received, may control the communicator to broadcast the pre-stored search signal related to the device type information and the identification information based on the search request, and the response signal may be a signal received from an external device related to the device type information and the identification information, among external devices which perform communication by using the second communication protocol.

The first communication protocol and the second communication protocol may use a same frequency band.

The terminal device may receive intensity information of a plurality of response signals which are received from the external device determined as the searching object device from a plurality of electronic devices, and determine a position of the external device determined as the searching object device based on the intensity information of the plurality of response signals.

In accordance with an aspect of the present disclosure, a terminal device operable in association with a plurality of electronic devices for determining a position of a searching object device is provided. The terminal device includes a communicator configured to perform data communication with the plurality of electronic devices and transmit a search request for the searching object device, and a at least one processor configured to, in response to intensity information of response signals of the searching object device which are received from the plurality of electronic devices being received through the communicator in response to the search request, to determine a position of the searching object device based on the intensity information of the response signals.

The terminal device may further include a display and the at least one processor, in response to image data of an area where the searching object device is disposed being received from at least one capturing device, may control the display to display the position of the searching object device based on the image data and the determined position.

The at least one processor may control the communicator to transmit position information of the searching object device to an external user terminal and the external user terminal may display the position of the searching object device based on the position information.

The plurality of electronic devices may perform communication by using a first communication protocol, the searching object device may perform communication by using a second communication protocol different from the first communication protocol, and the at least one processor control the communicator to transmit a search request for the searching object device which performs communication by using the second communication protocol to the plurality of electronic devices according to a first search command, transmit a search request including device type information for the searching object device which performs communication by using the second communication protocol to the plurality of electronic devices according to a second search command, and transmit a search request including device type information and identification information for the searching object device which performs communication by using the second communication protocol to the plurality of electronic devices according to a third search command.

According to the above-described various embodiments of the present disclosure, various IOT services, such as providing a location of a searching object device requested by a user may be provided by using an electronic device through a heterogeneous communication protocol.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2A is a first procedure diagram illustrating position searching between heterogeneous communication protocol devices according to an embodiment of the present disclosure;

Throughout the drawings, it should be noted that like reference numbers are used to depict the same or similar elements, features, and structures.

DETAILED DESCRIPTION

Figure 1:
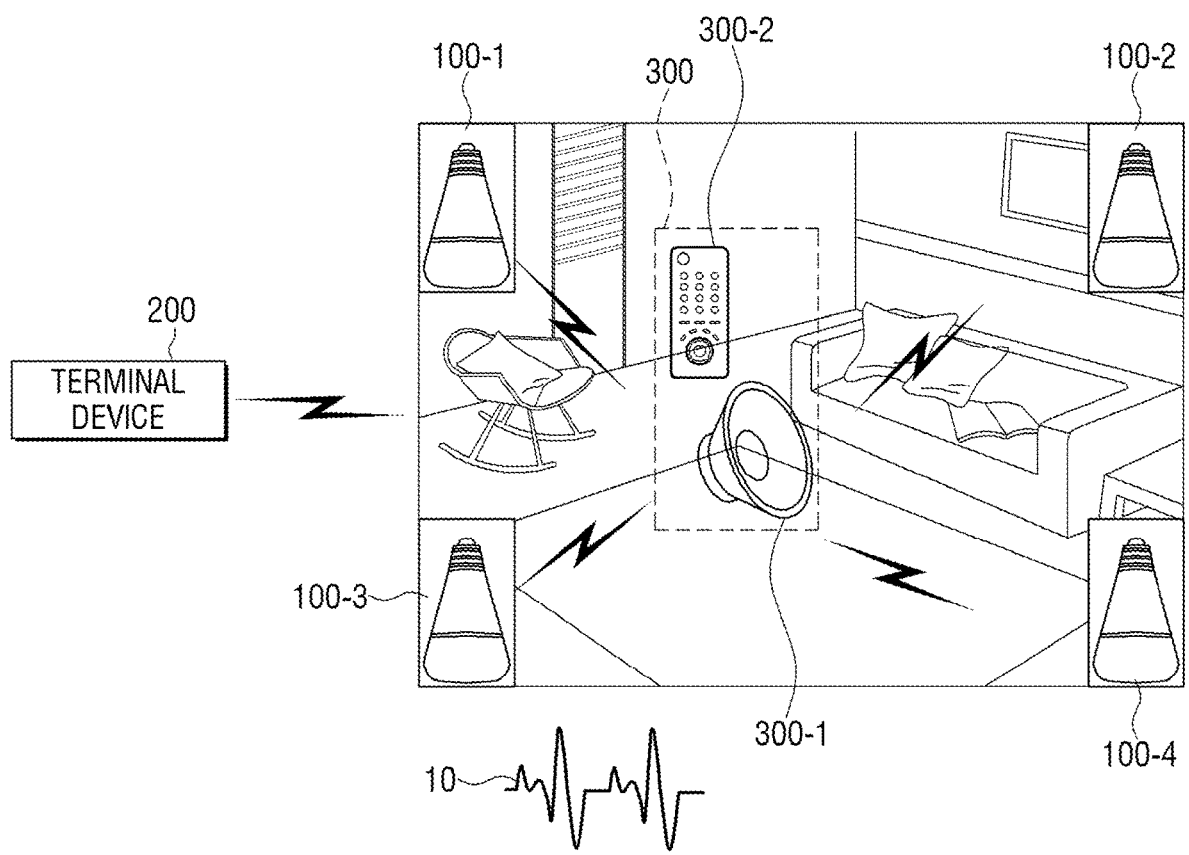
FIG. 1 is a system diagram illustrating position searching between heterogeneous communication protocol devices according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Before describing the present disclosure in detail, a method of describing the present specification and drawings will be introduced.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed based on the entire contents of this specification and common technical knowledge in the art.

In addition, the same reference numerals as used in the accompanying drawings denote parts or components performing substantially the same function. For ease of explanation and understanding, different embodiments will be described using the same reference numerals. In other words, even though all the elements having the same reference numerals are shown in the plural drawings, the plural drawings do not mean one embodiment.

The terms, such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

The terms used in the application are merely used to describe particular various embodiments of the present disclosure, and are not intended to limit the disclosure. Singular forms in the disclosure are intended to include the plural forms as well, unless the context clearly indicates otherwise. It will be further understood that terms, such as "including" or "having," or the like, are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In an embodiment of the present disclosure, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module and may be realized as at least one processor except for 'modules', 'units' or 'parts' that should be realized in a specific hardware.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Hereinafter, various embodiments of the present disclosure will be described with reference to the accompanying drawings.

FIG. 1 is a system diagram illustrating position searching between heterogeneous communication protocol devices according to an embodiment of the present disclosure.

Referring to FIG. 1, a system for searching positions of heterogeneous communication protocol devices may include a plurality of electronic devices (hereinafter, referred to as first, second, third and fourth electronic devices) 100-1, 100-2, 100-3 and 100-4, a terminal device 200 and a plurality of external devices 300.

The first to fourth electronic devices 100-1 to 100-4 may be search devices for searching a position of a searching object device, and at least one of the plurality of external devices 300 may be the searching object device.

The first to fourth electronic devices 100-1 and 100-4 and the plurality of external devices 300 may be Internet of things (JOT) devices capable of performing short-distance wireless communication by using a first communication protocol or a second communication protocol with the same frequency band (e.g., a frequency band of 2.4 GHz), such as a smart light device, a speaker, a remote controller, a smartphone, a smart camera, a device for capturing an image, or the like. In other words, the first to fourth electronic devices 100-1 and 100-4 and the plurality of external device 300 may be search devices for searching the position of a searching object device or searching object devices depending on a user's device settings.

According to the present disclosure, it is exemplified that the first to fourth electronic devices 100-1 to 100-4 may be smart light devices, among the plurality of external devices 300, a first external device 300-1 may be a speaker, and a second external device 300-2 may be a remote controller.

The terminal device 200 may be a user terminal (not shown), such as a smart phone and perform communication by using the same protocol as the first to fourth electronic devices 100-1 and 100-4 and the plurality of external devices 300. Depending on an embodiment of the present disclosure, the terminal device 200 may be an IOT hub.

However, the present disclosure is not limited thereto, but the terminal device 200 may be the user terminal (not shown), such as a smart phone. In the present disclosure, it is exemplified that the terminal device 200 may be the IOT hub.

Specifically, the user terminal (not shown) may transmit a user command for device searching to the terminal device 200. Accordingly, the terminal device 200 may transmit search requests to the first to fourth electronic devices 100-1 to 100-4, which are pre-determined, based on a user command received from the user terminal (not shown). The user command may be search information with respect to a searching object device which performs communication by using a specific communication protocol, and the first to fourth electronic devices 100-1 to 100-4 may be devices which are pre-determined as search devices.

Therefore, the terminal device 200 may transmit the search requests to the first to fourth electronic devices 100-1 to 100-4, which are set to the search devices, according to the user command received from the user terminal (not shown).

However, the present disclosure is not limited thereto, but the user terminal (not shown) may transmit a user command including identification information with respect to an IOT device selected from a plurality of IOT devices according to a user command. The terminal device 200 may set the IOT device corresponding to the identification information included in the user command received from the user terminal (not shown) to a search device and transmits a search request to the IOT device set to the search device.

According to the present disclosure, it is exemplified that search requests may be transmitted to the first to fourth electronic devices 100-1 to 100-4, which are pre-determined to the terminal device 200.

As shown above, the terminal device 200 may transmit the search requests to the first to fourth electronic devices 100-1 to 100-4 which are set to the search devices according to a user command received from the user terminal (not shown).

In response to search requests being received from the terminal device 200, the first to fourth electronic devices 100-1 to 100-4 may broadcast pre-defined search signals in response to the received search requests.

Therefore, the first external device 300-1 and the second external device 300-2 may receive the broadcasted search signals from the first to fourth electronic devices 100-1 to 100-4. In response to the broadcasted search signals being received from the first to fourth electronic devices 100-1 to 100-4, the first external device 300-1 and the second external device 300-2 may determine whether the received search signals are related to the first external device 300-1 and the second external device 300-2. In other words, in response to search signals being received, the first external device 300-1 or the second external device 300-2 may compare a pattern of the received search signal with a pattern of a predetermined signal, and if the pattern of the received search signal corresponds to the pattern of the predetermined signal, may determine that the received search signal is related to the first external device 300-1 or the second external device 300-2.

If the pattern of the received search signal corresponds to a pattern of a device signal predetermined to the first external device 300-1, the first external device 300-1 may transmit a response signal in a broadcasting method. The response signal may be the device signal predetermined to the first external device 300-1.

Accordingly, in response to the response signal transmitted from the first external device 300-1 in the broadcasting method being received, the first to fourth electronic devices 100-1 to 100-4 may analyze a pattern of the received response signal and determine whether the first external device 300-1 is a searching object device.

For example, in response to a search request for a device capable of Bluetooth (BT) communication being received, the first to fourth electronic devices 100-1 to 100-4 each may transmit a first search signal 10 having a pre-defined pattern in the broadcasting method according to the received search request as shown in FIG. 1. Accordingly, the plurality of external devices 300 may receive the first search signals 10, and each of the plurality of external devices 300 may compare a pattern of the first search signal 10 which is received from at least one of the first to fourth electronic devices 100-1 to 100-4 with the pattern of the predetermined device signal. As a result of comparison, if a device signal of the first external device 300-1, which is a speaker, corresponds to the pattern of the first search signal 10, the first external device 300-1 may transmit a response signal in the broadcasting method. As described above, the response signal may be the device signal predetermined to the first external device 300-1.

In response to response signals transmitted from the first external device 300-1 being received, each of the first to fourth electronic devices 100-1 to 100-4 may compare the pattern of the received response signal with a pattern of a pre-transmitted search signal and if the patterns of two signals correspond to each other, may determine that the response signal transmitted from the first external device 300-1 is a signal transmitted from a searching object device.

However, the present disclosure is not limited thereto, and when only the response signal transmitted from the first external device 300-1 is received within a predetermined critical time, the first to fourth electronic devices 100-1 to 100-4 may determine that the response signal transmitted from the first external device 300-1 may be the signal transmitted from the searching object device.

In an embodiment of the present disclosure, in response to a searching object device being determined, the first to fourth electronic devices 100-1 to 100-4 may obtain intensity information of the response signal which is received from the first external device 300-1 and transmit the intensity information to the terminal device 200 to determine a position of the first external device 300-1 which is determined as the searching object device.

Accordingly, the terminal device 200 may determine the position of the first external device 300-1 which is determined as the searching object device based on the intensity information received from the first to fourth electronic devices 100-1 to 100-4. The terminal device 200 may transmit position information of the first external device 300-1 which is determined as the searching object device to the user terminal (not shown). Accordingly, the user terminal (not shown) may display a device image with respect to the first external device 300-1, which is a searching object device, on a pre-stored map UI based on the position information received from the terminal device 200.

The user terminal (not shown) may display an image of an area where the first external device 300-1 determined as the searching object device is disposed.

According to an embodiment of the present disclosure, the terminal device 200 may periodically receive image data captured by at least one capturing device 400. Accordingly, the terminal device 200, in response to the position information of the first external device 300-1 determined as the searching object device being obtained, may transmit image data captured by a capturing device 400 disposed on the area where the first external device 300-1 determined as the searching object device is disposed, among a plurality of image data, and the pre-obtained position information to the user terminal (not shown).

Accordingly, the user terminal (not shown) may display the image of the area where the first external device 300-1 determined as the searching object device is disposed based on the position information received from the terminal device 200 and the image data.

According to an embodiment of the present disclosure, the terminal device 200 may store position information for each of the plurality of capturing devices 400. Therefore, the terminal device 200 may select the capturing device 400 capable of capturing the image of the area where the first external device 300-1 is disposed, among the plurality of capturing devices 400, by using the pre-stored position information of each of the plurality of capturing devices 400 and the pre-obtained position information of the first external device 300-1 determined as the searching object device. The terminal device 200 may request for capturing to the capturing device 400 which is selected, and in response to image data being received from the capturing device 400 that receives the capturing request, transmit the received image data and the pre-obtained position information to the user terminal (not shown).

Accordingly, the user terminal (not shown) may display the image of the area where the first external device 300-1 determined as the searching object device is disposed based on the position information received from the terminal device 200 and the image data.

As described above, in the case where the terminal device 200 is the user terminal (not shown), such as a smart phone, the terminal device 200 may display the device image of the first external device 300-1 determined as the searching object device on the pre-stored map UI based on the position information of the first external device 300-1 which is the searching object device, or display the image of the area where the first external device 300-1 is disposed.

FIG. 2A is a first procedure diagram illustrating position searching between heterogeneous communication protocol devices according to an embodiment of the present disclosure.

Referring to FIG. 2A, the terminal device 200, in response to a user command for device searching being received from the user terminal (not shown), may transmit search requests to an electronic device 100 of a plurality of electronic devices which are predetermined according to the received user command at operation S10.

However, the present disclosure is not limited thereto, but as described above, the user terminal (not shown) may transmit a user command including identification information with respect to an IOT device selected by a user, among a plurality of IOT devices. The terminal device 200 may set an IOT device corresponding to the identification information included in the user command received from the user terminal (not shown) to a search device, and transmit a search request to the IOT device set to the searching device.

As described above, each of the first to fourth electronic devices 100-1 to 100-4, in response to a search request being received from the terminal device 200, may obtain a search signal corresponding to the received search request, among a plurality of pre-defined search signals at operation S11. The first to fourth electronic devices 100-1 to 100-4 may transmit the obtained search signals in the broadcasting method at operation S12. Accordingly, the plurality of external devices 300 may receive search signals transmitted from the first to fourth electronic devices 100-1 to 100-4.

For example, among the plurality of external devices 300, the first external device 300-1 may be a speaker, and the second external device 300-2 may be a remote controller. In addition, the first external device 300-1 and the second external device 300-2 may have the same frequency band and perform communication by using different communication protocols. For example, the first external device 300-1 may perform communication by using a first communication protocol, and the second external device 300-2 may perform communication by using a second communication protocol. In addition, a search signal may be a request signal for a searching object device which performs communication through the first communication protocol.

According to an embodiment of the present disclosure, the first external device 300-1 may be a speaker and the second external device 300-2 may be a remote controller. In addition, the first external device 300-1 and the second external device 300-2 may perform communication through the same first communication protocol, and a search signal may be a request signal for a speaker of the searching object devices which perform communication through the first communication protocol.

In this case, the pattern of the device signal predetermined to the first external device 300-1 which performs communication through the first communication protocol may correspond to the pattern of the search signal. If the pattern of the device signal which is predetermined to the first external device 300-1 corresponds to the pattern of the search signal, the first external device 300-1 may transmit a response signal with respect to the search signal at operation S13. The first external device 300-1 may transmit the response signal with respect to the search signal in the broadcasting method. The response signal may be the device signal predetermined to the first external device 300-1.

In response to response signals transmitted from the first external device 300-1 being received, each of the first to fourth electronic devices 100-1 to 100-4 may analyze a pattern of the received response signal and determine whether the first external device 300-1 is a searching object device at operation S14. As a result of determination, if the first external device 300-1 is the searching object device, the first to fourth electronic devices 100-1 to 100-4 may obtain intensity information of the response signals received from the first external device 300-1 and transmit the obtained intensity information of the response signals received from the first external device 300-1 to the terminal device 200 at operation S15.

Accordingly, the terminal device 200 may determine the position of the first external device 300-1 by using at least three of the received intensity information from the first to fourth electronic devices 100-1 to 100-4 and transmit the determined position information to the user terminal (not shown) at operation S16.

Accordingly, the user terminal (not shown) may display the device image with respect to the first external device 300-1 determined as the searching object device on the pre-stored map UI based on the position information received from the terminal device 200.

Figure 2B:
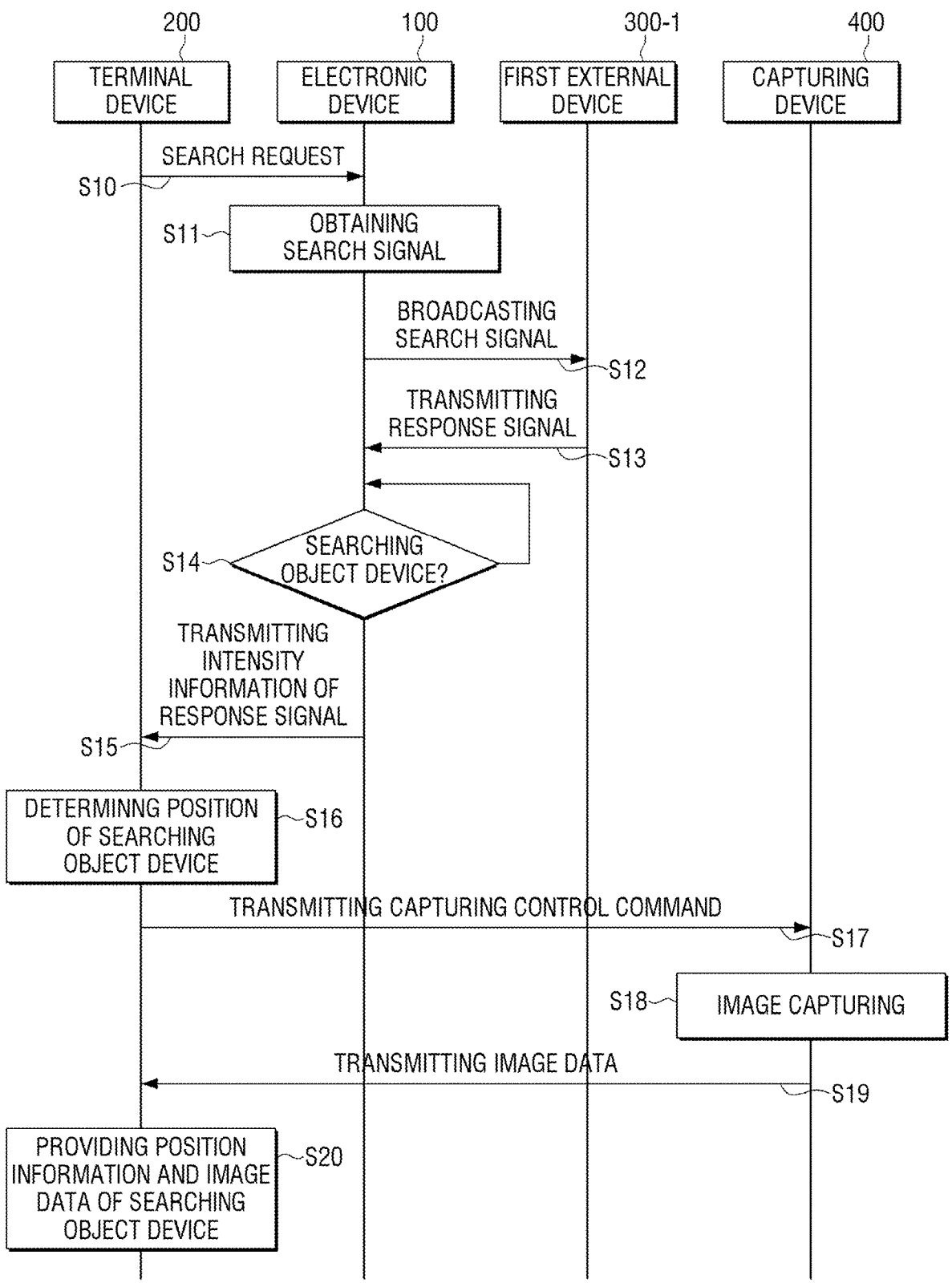
FIG. 2B is a second procedure diagram illustrating position searching between heterogeneous communication protocol devices according to another embodiment of the present disclosure.

FIG. 2B is a second procedure diagram illustrating position searching between heterogeneous communication protocol devices according to another embodiment of the present disclosure.

Referring to FIG. 2A, through operation S10 to operation S16, the first to fourth electronic devices 100-1 to 100-4 may transmit the intensity information with respect to the response signals received from the first external device 300-1 determined as the searching object device to the terminal device 200. Accordingly, the terminal device 200 may determine the position of the first external device 300-1 which is determined as the searching object device by using at least three of the intensity information of the response signals received from the first to fourth electronic devices 100-1 to 100-4.

In response to the position of the first external device 300-1 determined as the searching object device being determined, the terminal device 200 may transmit a capturing control command to the capturing device 400 which is disposed on the area related to the first external device 300-1 determined as the searching object device, among the plurality of capturing devices 400, by using the pre-stored position information for each of the plurality of capturing devices 400 at operation S17.

The capturing device 400 which receives the capturing control command from the terminal device 200 may capture an image in accordance with the capturing control command and transmit the captured image data to the terminal device 200 at operations S18 and S19. Accordingly, the terminal device 200 may transmit the position information of the first external device 300-1 determined as the searching object device and the image data received from the capturing device 400 to the user terminal (not shown).

The user terminal (not shown) may display the image of the area where the first external device 300-1 determined as the searching object device is disposed based on the position information received from the terminal device 200 and the image data.

In the case where the terminal device 200 is the user terminal (not shown), the terminal device 200 may display the image of the area where the first external device 300-1 determined as the searching object device is disposed based on the position information of the first external device 300-1 determined as the searching object device and the image data at operation S20.

The image data with respect to the area where the first external device 300-1 determined as the searching object device is disposed may be obtained through the embodiment as below.

Specifically, the terminal device 200 may periodically receive image data from the plurality of capturing devices 400. In this case, the terminal device 200, in response to the position information of the first external device 300-1 determined as the searching object device being obtained, may transmit the image data captured by the capturing device 400 disposed on the area where the first external device 300-1 determined as the searching object device is disposed, among the plurality of image data, and pre-obtained position information to the user terminal (not shown) by using the pre-stored position information of each of the plurality of capturing devices 400.

Accordingly, the user terminal (not shown) may display the image of the area where the first external device 300 determined as the searching object device is disposed based on the position information received from the terminal device 200 and the image data.

Hereinafter, the electronic device 100 of the present disclosure will be described.

Figure 3:
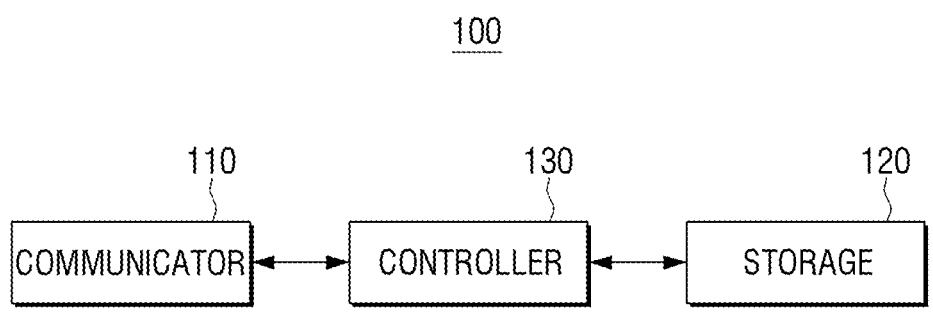
FIG. 3 is a block diagram illustrating an electronic device according to an embodiment of the present disclosure.

FIG. 3 is a block diagram illustrating an electronic device according to an embodiment of the present disclosure.

Referring to FIG. 3, the electronic device 100 may be an IOT device capable of performing short-distance communication through at least one of first and second communication protocols having the same frequency band, such as a smart light device, a speaker, a remote controller, a smart phone, a smart camera, a device for capturing an image, or the like.

The electronic device 100 and the external device 300 will be defined as below prior to describing the electronic device 100 according to the present disclosure. An IOT device which broadcasts the pre-stored search signal in response to the search request received from the terminal device 200, among a plurality of IOT devices, will be defined as the electronic device 100, and an IOT device which receives the broadcasted search signal will be defined as the external device 300.

Such the electronic device 100 may include a communicator 110, a storage 120 and a controller 130.

The communicator 110 may receive a search request for a searching object device by performing data communication with the terminal device 200 and broadcast a pre-stored search signal in response to the received search request. In other words, the communicator 110 may perform data communication with a paired terminal device 200 by using the first communication protocol and receive the search request. In addition, the communicator 110, in response to the search request being received from the terminal device 200, may transmit a search signal with respect to the received search request in the broadcasting method.

The communicator 110 may be embodied as a short-distance communication module (not shown) according to an embodiment. The short-distance communication module (not shown) may be a module for performing wireless communication with the terminal device 200 which is disposed at a short distance and include at least one of (BT) module, near field communication (NFC) module, WiFi module and Zigbee module.

The storage 120 described above may store a plurality of pre-defined search signals related to the search request received from the terminal device 200.

The controller 130 may control overall operations of constituents of the electronic device 100. Specifically, the controller 130, in response to a response signal being received from the external device 300 through the communicator 110 in response to the search signal transmitted in the broadcasting method, may determine whether the external device 300 is a searching object device by analyzing a pattern of the received response signal. As a result of determination, if it is determined that the external device 300 is the searching object device, the controller 130 may control the communicator 110 to obtain intensity information of the received response signal and transmit the intensity information to the terminal device 200.

In accordance with such the control command, the communicator 110 may transmit the intensity information of the response signal to the terminal device 200. Accordingly, the terminal device 200, in response to the intensity information of the response signal of the external device 300 determined as the searching object device being received from the plurality of electronic devices 100, may obtain the position information of the external device 300 determined as the searching object device by using at least three of the intensity information.

Figure 4:
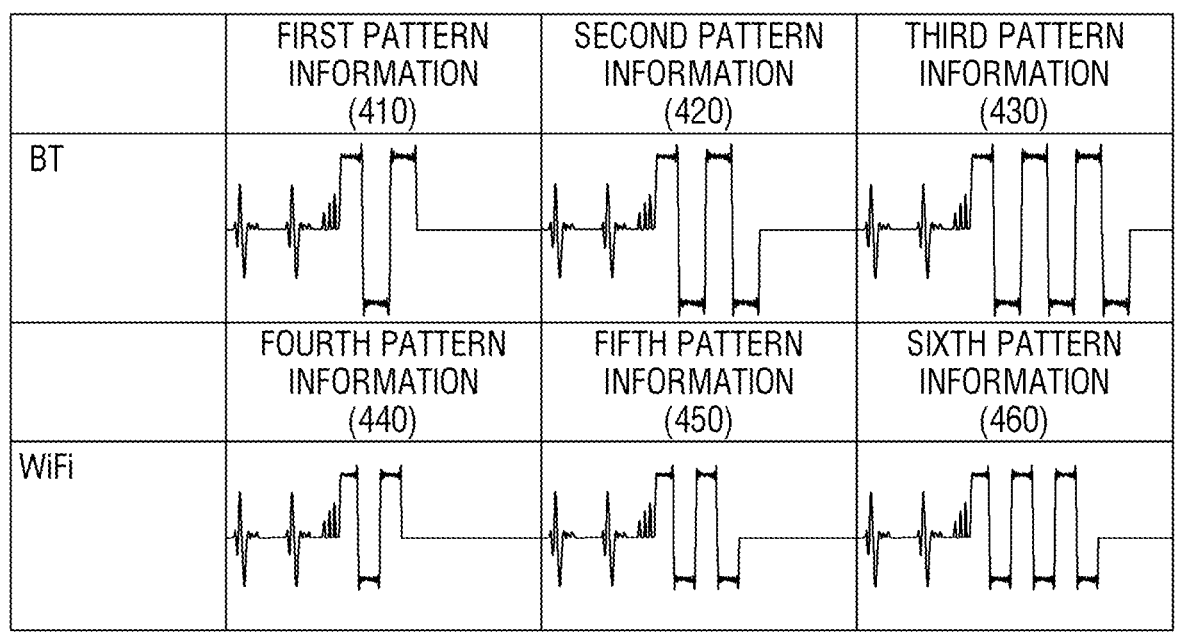
FIG. 4 is an diagram illustrating a plurality of search signals stored in a storage of an electronic device according to an embodiment of the present disclosure.

As shown in FIG. 4, the storage 120 may store the plurality of pre-defined search signals in a table form.

FIG. 4 is a diagram illustrating a plurality of search signals stored in a storage of an electronic device according to an embodiment of the present disclosure.

Referring to FIG. 4, the storage 120 may store pattern information corresponding each of the plurality of pre-defined search signals related to the search request for searching a searching object device.

As shown, first pattern information 410 stored in the storage 120 may be pattern information of the search signal which is pre-defined related to a search request for searching a searching object device which performs communication by using a first communication protocol, such as BT.

Second pattern information 420 stored in the storage 120 may be pattern information which is pre-defined related to a search request for searching a device object included in a specific category, among the searching object devices which perform communication by using the first communication protocol.

Thirst pattern information 430 stored in the storage 120 may be pattern information which is pre-defined related to a search request for searching a specific device, among the searching object devices which perform communication by using the first communication protocol, such as BT.

Fourth pattern information 440 may be pattern information which is pre-defined related to a search request for searching a searching object device which performs communication by using a second communication protocol, such as WiFi.

Fifth pattern information 450 stored in the storage 120 may be pattern information of a search signal which is pre-defined related to a search request for searching a device object included in a specific category, among the searching object devices which perform communication by using the second communication protocol.

Sixth pattern information 460 stored in the storage 120 may be pattern information of a search signal which is pre-defined related to a search request for searching a specific device, among the searching object devices which perform communication by using the second communication protocol, such as WiFi.

The controller 130, in response to a search request being received from the terminal device 200, may obtain pattern information related to the received search request of pattern information with respect to a plurality of pre-stored search signals and generate a search signal based on the obtained pattern information. Therefore, the communicator 110 may transmit the search signal generated in response to the search request which is received from the terminal device 200 in the broadcasting method.

According to an embodiment of the present disclosure, in response to a search request for a searching object device which performs communication by using the second communication protocol being received, the controller 130 may obtain the information of a pre-stored pattern related to a second communication method of a plurality of pattern information which are pre-stored in the storage 120 and generate a search signal based on the obtained pattern information. The controller 130 may control the communicator 110 to broadcast the generated search signal.

The communicator 110 may transmit a search signal in the broadcasting method and the plurality of external devices 300 may receive the search signals transmitted in the broadcasting method. In response to the search signal being received, each of the plurality of external devices 300 may compare a pattern of the received search signal and a pattern of a pre-stored device signal, and at least one of the plurality of external device 300, where the pattern of the received search signal corresponds to the pattern of the pre-stored device signal, may transmit a response signal with respect to the search signal. The external device 300 may transmit the response signal with respect to the search signal in the broadcasting method.

Therefore, the controller 130 may analyze a pattern of the response signal received from the at least one of the plurality of external devices 300 through the communicator 110 and determine whether the at least one of the plurality of external devices 300 which transmits the response signal is a searching object device. In other words, the controller 130 may compare a pattern of the search signal transmitted in the broadcasting method with a pattern of the response signal received from the at least one of the plurality of external devices 300 and determine the external device 300 where two signal patterns correspond to each other as a searching object device.

The controller 130 may transmit intensity information of the response signal received from the external device 300 which is determined as the searching object device to the terminal device 200 which transmits a search request. Through such embodiment of the present disclosure, the terminal device 200 may receive the intensity information of the response signal of the external device 300 determined as the searching object device from the plurality of electronic devices 100 and obtain position information of the external device 300 determined as the searching object device which performs communication by using the second communication protocol based on at least three of a plurality of received intensity information.

According to an embodiment of the present disclosure, in response to a search request including device type information with respect to the searching object device which performs communication by using the second communication protocol being received, the controller 130 may obtain pre-stored pattern information related to the received search request of a plurality of pattern information which are stored in the storage 120 and generate a search signal based on the obtained pattern information. The controller 130 may control the communicator 110 to broadcast the generated search signal.

The communicator 110 may transmit a search signal in the broadcasting method and the plurality of external devices 300 may receive the search signals transmitted in the broadcasting method. In response to the search signal being received, each of the plurality of external devices 300 may compare the pattern of the received search signal with the pattern of the pre-stored device signal, and at least one of the plurality of external devices 300, where the pattern of the received search signal corresponds to the pattern of the pre-stored device signal, may transmit a response signal with respect to the search signal. In other words, among the plurality of external devices 300, only the external device 300 which uses the second communication protocol and corresponds to the device type information may transmit the response signal with respect to the search signal. Such the external device 300 may transmit the response signal with respect to the search signal in the broadcasting method.

Therefore, the controller 130 may analyze a pattern of the response signal received from at least one of the plurality of external devices 300 and determine whether the at least one of the plurality of external devices 300 which transmits the response signal is a searching object device. In other words, the controller 130 may compare a pattern of the search signal transmitted in the broadcasting method with a pattern of the response signal received from the at least one of the plurality of external devices 300 and determine the external device 300 where the patterns of two signals correspond to each other as the searching object device which performs communication by using the second communication protocol and corresponds to the device type information.

The controller 130 may transmit the intensity information of the response signal received from the external device 300 determined as a searching object device to the terminal device 200 which transmits a search request. Through such embodiment of the present disclosure, the terminal device 200 may receive the intensity information of the response signal of the external device 300 determined as the searching object device from the plurality of electronic devices 100 and obtain the position information of the external device 300 determined as the searching object device based on at least three of the plurality of received intensity information.

According to an embodiment of the present disclosure, in response to a search request including device type information and identification information with respect to a searching object device which performs communication by using a second communication protocol being received, the controller 130 may obtain pre-stored pattern information related to the received search request of a plurality of information which are pre-stored in the storage 120 and generate a search signal based on the obtained pattern information. The controller 130 may control the communicator 110 to broadcast the generated search signal.

The communicator 110 may transmit a search signal in the broadcasting method and the plurality of external devices 300 may receive the search signals transmitted in the broadcasting method. In response to the search signal being received, each of the plurality of external devices 300 may compare the pattern of the received search signal with the pattern of the pre-stored device signal and the external device 300 where the pattern of the received search signal corresponds to the pattern of the pre-stored device signal may transmit a response signal with respect to the search signal. In other words, among the plurality of external devices 300, only the external device 300 which uses the second communication protocol and corresponds to the device type information and the identification information may transmit the response signal with respect to the search signal. Such the external device 300 may transmit the response signal with respect to the search signal in the broadcasting method.

The controller 130 may analyze the pattern of the response signal received from the external device 300 through the communicator 110 and determine whether the external device 300 which transmits the response signal is a searching object device. In other words, the controller 130 may compare the pattern of the search signal transmitted in the broadcasting method with the pattern of the response signal received from the external device 300 and determine that the external device 300 where the patterns of two signals correspond to each other, the external device 300 transmitting the response signal, as the searching subject device which performs communication by using the second communication protocol and corresponds to the device type information and the identification information.

The controller 130 may transmit the intensity information of the response signal received from the external device 300 determined as the searching object device to the terminal device 200 which transmit a search request. Through such embodiment of the present disclosure, the terminal device 200 may receive the intensity information with respect to the response signal of the external device 300 determined as the searching object device and obtain the position information of the external device 300 determined as the searching object device based on at least three of the plurality of received intensity information.

Figure 5:
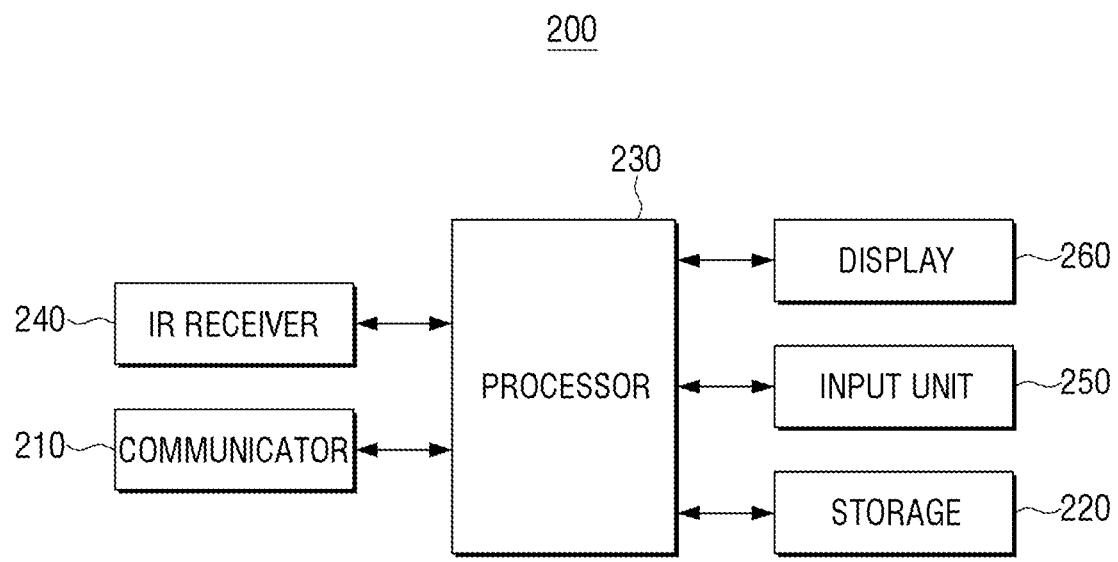
FIG. 5 is a block diagram illustrating a terminal device according to an embodiment of the present disclosure.

FIG. 5 is a block diagram illustrating a terminal device according to an embodiment of the present disclosure.

Referring to FIG. 5, in the case where the terminal device 200 is a device which is capable of communicating by using the same communication protocol as a plurality of IOT devices including the user terminal (not shown), the electronic device 100 and the external device 300, the terminal device 200 may be an IOT hub.

The terminal device 200 may include a communicator 210, a storage 220 and a processor 230.

The communicator 210 may transmit a search request for a searching object device by performing data communication with the plurality of electronic devices 100. In other words, the communicator 210 may transmit the search request with respect to the searching object device by performing data communication with the plurality of electronic devices 100 which are paired by using the first communication protocol.

The communicator 110 may be embodied as a short-distance wireless communication module (not shown) depending on an embodiment. The short-distance communication module (not shown) may be a module for performing wireless communication with the terminal device 200 disposed at a short distance and include at least one of (BT) module, NFC module, WiFi module and Zigbee module.

In response to search requests being transmitted to the plurality of electronic devices 100 through the communicator 210, the plurality of electronic devices 100 may broadcast and transmit pre-stored search signals in response to the search request received from the terminal device 200. Accordingly, at least one of the plurality of external devices 300 may transmit s response signal for the search signal, and the plurality of electronics device 100 may obtain intensity information of the response signal received from the external device 300 determined as a searching object device and transmit the intensity information to the terminal device 200.

The storage 220 may store device information of an IOT device including the electronic device 100 and the external device 300, which are registered to the terminal device 200, and terminal device information of the user terminal (not shown).

The processor 230 may control overall operations of constituents of the terminal device 200. Specifically, the processor 230 may control the communicator 210 to transmit search requests for searching a searching object device corresponding to a user command to the plurality of electronic devices 100. Accordingly, the communicator 210 may transmit the search requests for searching the searching object device to the plurality of electronic devices 100 which are pre-registered.

The plurality of electronic devices 100 may perform communication by using the first communication protocol, and the external device 300 determined as the searching object device may perform communication by using the second communication protocol different from the first communication protocol.

According an embodiment of the present disclosure, the processor 230 may control the communicator 210 to transmit search requests for searching a searching object device which performs communication by using the second communication protocol to the plurality of electronic devices 100 if a user command is a first search command.

If the user command is a second search command, the processor 230 may control the communicator 210 to transmit search requests including device type information for the searching object device which performs communication by using the second communication protocol to the plurality of electronic devices 100.

If the user command is a third searching command, the processor 230 may control the communicator 210 to transmit search requests including device type information and identification information for the searching object device which performs communication by using the second communication protocol to the plurality of electronic devices 100.

According to a control command of the processor 230, the communicator 210 may transmit search requests for searching a searching object device to the plurality of electronic devices 100. As described above, the processor 230 may broadcast a pre-stored search signal in response to the search request received from the terminal device 200 and transmit the intensity information of the response signal received from the external device 300 determined as the searching object device to the terminal device 200.

In response to the intensity information of the response signal of the external device 300 determined as the searching object device being received from the plurality of electronic devices 100, the processor 230 may determine the position of the external device 300 determined as the searching object device by using Received Signal Strength Indicator (RSSI) of at least three response signals, among the plurality of received intensity information, and obtain the position information of the external device 300.

According to an embodiment of the present disclosure, the processor 230 may determine the position of the external device 300 determined as the searching object device by applying a triangulation method to the intensity information of the at least three response signals. Since such the location tracking technology is known to the public, the detailed description thereof will be omitted.

In response to the position information of the external device 300 determined as the searching object device being obtained, the processor 230 may control the communicator 210 to transmit the position information of the external device 300 determined as the searching object device to the user terminal (not shown). Accordingly, the communicator 210 may transmit the position information of the external device 300 determined as the searching object device to the user command (not shown).

Figure 6:
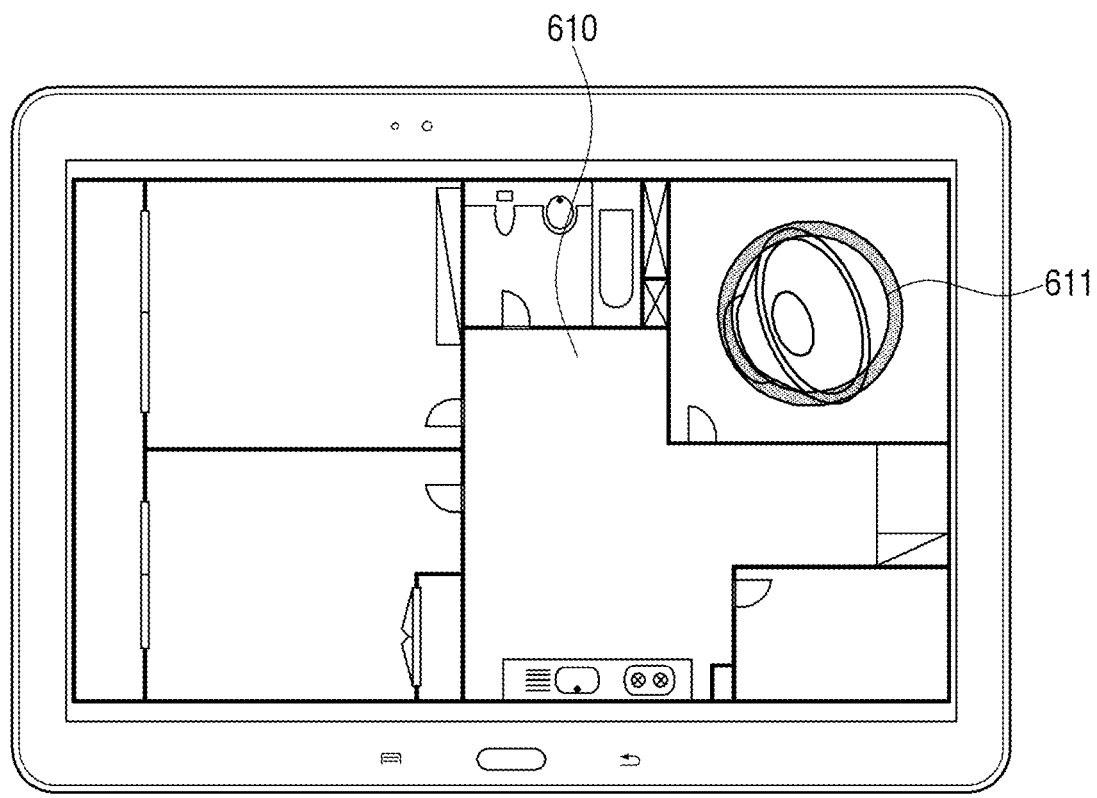
FIG. 6 is a first diagram illustrating a position of a searching object device in a user terminal according to an embodiment of the present disclosure.

Accordingly, as shown in FIG. 6, the user terminal (not shown) may display a device image for the external device 300 determined as the searching object device on the pre-stored map UP based on the position information received from the terminal device 200.

Figure 7:
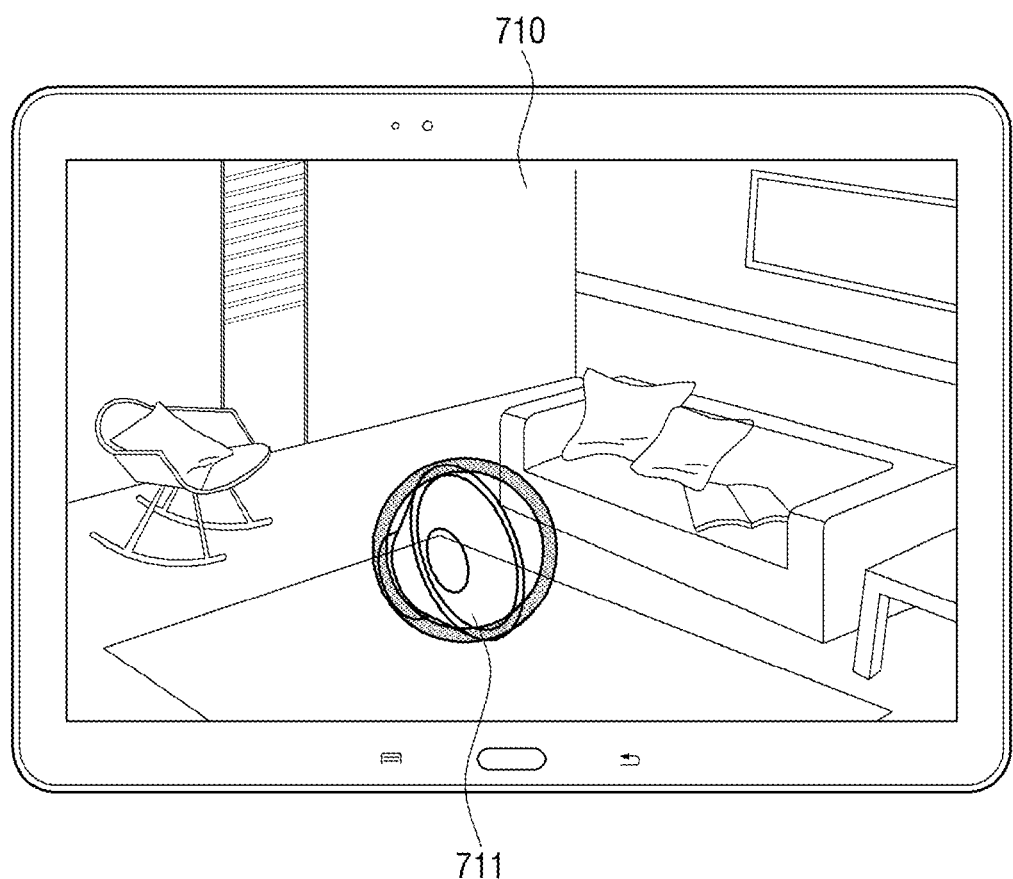
FIG. 7 is a second diagram illustrating position information of a searching object device in a user terminal according to another embodiment of the present disclosure.

FIG. 6 is a first diagram illustrating a position of a searching object device in a user terminal according to an embodiment of the present disclosure, and FIG. 7 is a second diagram illustrating position information of a searching object device in a user terminal according to another embodiment of the present disclosure.

Referring to FIG. 6, the user terminal (not shown), according to an input user command, may request for searching a speaker, among searching object devices which perform communication by using the second communication protocol, to the terminal device 200. The terminal device 200 may transmit search requests for the speaker which performs communication by using the second communication protocol to the plurality of electronic devices 100 in response to the search request received from the user terminal (not shown). The plurality of electronic devices 100 may transmit the pre-stored search signals in the broadcasting method in response to the search requests received from the terminal device 200. Accordingly, among the plurality of external devices 300 which receive the broadcasted search signals, only the speaker may transmit a response signal with respect to the received search signal to each of the plurality of electronic devices 100. The plurality of electronic devices 100, in response to the response signal received from the speaker being determined as a searching object device, may transmit intensity information of the response signal received from the speaker to the terminal device 200.

Therefore, the terminal device 200 may obtain position information of the speaker based on the intensity information of the response signals of the speaker received from the plurality of electronic devices 100 and transmit the obtained position information to the user terminal (not shown).

Accordingly, the user terminal (not shown) may display a device image 611 for the speaker determined as the searching object device on a pre-stored map UI 610 based on the position information received from the terminal device 200 to display on a screen.

Referring to FIG. 7, the user terminal (not shown) may display a capturing image of an area where the external device 300 determined as the searching object device is disposed.

Accordingly, the user terminal (not shown) may display a device image 711 for the speaker determined as the searching object device on a pre-stored map UI 710 based on the position information received from the terminal device 200 to display on a screen.

Specifically, the communicator 210 of the terminal device 200 may receive image data of the area where the external device 300 determined as the searching object device is disposed from at least one capturing device 400. In response to the image data of the area where the external device 300 determined as the searching objecting device is disposed being received, the processor 230 may transmit the image data of the area where the external device 300 determined as the searching object device is disposed and the position information of the external device 300 determined as the searching object device to the user terminal (not shown).

Specifically, the processor 230, in response to the position information of the external device 300 determined as the searching object device being obtained, may select the capturing device 400 capable of image capturing of the area where the external device 300 is disposed, among a plurality of capturing devices 400, by using pre-stored position information of each of the plurality of capturing devices 400 and pre-obtained position information of the external device 300. The processor 230 may control the communicator 210 to transmit a capturing control command to the selected capturing device 400. Accordingly, the communicator 210 may transmit a capturing control command to the capturing device 400 capable of image capturing of the area where the external device 300 determined as the searching object device is disposed.

The capturing device 400 which receives the capturing control command may capture an image in accordance with the received capturing control command and transmit the captured image data to the terminal device 200. Accordingly, the processor 230 may control the communicator 210 to transmit the position information and image data of the external device 300 determined as the searching object device to the user terminal (not shown).

However, the present disclosure is not limited thereto, and the communicator 210 may periodically receive captured images from at least one capturing device 400. Therefore, the processor 230, in response to the position information of the external device 300 determined as the searching object device being obtained, may obtain the image data of the area where the external device 300 determined as the searching object device is disposed based on the obtained position information. The controller 120 may control the communicator 210 to transmit the position information and the image data of the external device 300 determined as the searching object device to the user terminal (not shown).

Through such various embodiments of the present disclosure, in response to the image data and the position information being received from the terminal device 200, the user terminal (not shown) may display the image of the area where the external device 300 determined as the searching object device is disposed on a screen based on the received image data and the position information.

As in the above-described embodiment of the present disclosure, the user terminal (not shown) may request for searching a speaker, among the searching object devices which perform communication by using the second communication protocol, to the terminal device 200 in accordance with the input user command. Accordingly, the terminal device 200, through the above-described embodiment of the present disclosure, may obtain and transmit the position information of the speaker and the image data of the area where the speaker is disposed to the user terminal (not shown) based on the intensity information of the response signals of the speaker received from the plurality of electronic devices 100.

Therefore, the user terminal (not shown), as shown in FIG. 7, may display an image 810 of an area 811 where a speaker determined as a searching object device is disposed based on the position information of the speaker received from the terminal device 200 and the image data of the area where the speaker is disposed.

In the case where the terminal device 200 is a user terminal (not shown), such as a smart phone or a display device (not shown), such as a smart TV, the terminal device 200 may further include an IR receiver 240, an input unit 250 and a display 260 in addition to the above-described constituents.

As shown above, the IR receiver 240 may receive a control signal for controlling the operation of the terminal device 200 from a remote control device (not shown) when the terminal device 200 is a display device (not shown). In addition, the IR receiver 240 may receive a pairing request signal for pairing with the terminal device 200 from an unregistered IOT device (hereinafter, referred to as a new electronic device).

For example, the unregistered new electronic device may output a pairing request signal when an initial power source is turned on. Accordingly, the IR receiver 240 may receive the pairing request signal output from the unregistered new electronic device. However, the present disclosure is not limited thereto, and the communicator 210 may receive the paring request signal output from the unregistered new electronic device.

In response to the pairing request signal being received through the IR receiver 240 or the communicator 210, the processor 230 may generate pattern information for a search signal of the new electronic device which requests for pairing. The processor 230 may store device information including pattern information of the search signal of the new electronic device in the storage 220 and perform registration of the new electronic device. The processor 230 may transmit registration information including the pre-generated pattern information of the search signal of the new electronic device to the new electronic device through the communicator 210 based on the received pairing request signal.

Accordingly, the new electronic device may store the pattern information included in the registration information received from the terminal device 200. Through such a registration process, after the new electronic device is registered to the terminal device 200, the new electronic device, in response to a search request for a searching object device being received from the terminal device 200, may generate a search signal from the pre-stored pattern information with respect to the received search request and transmit the generated search signal in the broadcasting method.

The input unit 250 may receive various user commands and transmit the user commands to the processor 230. The input unit 250 may include a microphone (not shown) for inputting a user command through a user's uttered voice and an operator (not shown) embodied as a keypad having various function keys, numeric keys, special keys, character keys, or the like (not shown). In addition, the input unit 250 may further include a touch input unit (not shown) embodied as a touch pad having an interactive layer structure with the display 260 when the display 260 described below is embodied as a touch screen.

The display 260 may display images of contents and be embodied as liquid crystal display (LCD), organic light emitting diode (OLED), plasma display panel (PDP), or the like.

The processor 230 may display the position of the external device 300 determined as the searching object device on a screen where a map UI is displayed and control the display 260 to display the image of the area where the external device 300 determined as the searching object device is disposed on the screen.

As shown above, the terminal device 200 may be the user terminal (not shown), such as a smart phone or the display device (not shown), such as a smart TV. In such the case, the display 260, according to the control command of the processor 230, as shown in FIG. 6, may display the position of the external device 300 determined as the searching object device on the screen where the map UI is displayed, or as shown in FIG. 7, may display the image of the area where the external device 300 determined as the searching object device is disposed on the screen.

The storage 220 may further store an operation system program for operating the terminal device 200 and an application program.

The operation system may be read by the storage 220 when the terminal device 200 is turned on and compiled to be a program for operating each constituent of the terminal device 200. The application program may be read by the storage 220 by the operation system based on a user's execution command, transferred to a form for executing and perform various operations. The storage 220 may store various multimedia data processed by the processor 230, contents data, and data received from an external source.

The storage 220 may be embodied as at least one of a read only memory (ROM), a random access memory (RAM) or a memory card detachable from/attachable to the terminal device 200 (e.g., a secure digital (SD) card, a memory stick, or the like), a nonvolatile memory, a volatile memory, a hard disk drive (HDD), or a solid state drive (SSD).

As shown above, when the terminal device 200 is the user terminal (not shown), such as a smart phone, the processor 230 may include a central processing unit (CPU), a ROM, a RAM, and a graphical processing unit (GPU), and the CPU, the ROM, the RAM, and the GPU may be interconnected via a bus.

The CPU may access the storage 220 and perform booting using the operating system program stored in the storage 220. In addition, the CPU may perform various operations using various programs, contents, data, and the like stored in the storage 220.

The ROM may store a command set for system booting. When a turn-on command is input and power is supplied, the CPU may copy the operation system stored in the storage 220 to the RAM according to a command stored in the ROM, and execute the operation system for system booting. When the system booting is completed, the CPU may copy various programs stored in the storage 220 to the RAM, execute the programs copied to the RAM and perform various operations.

The GPU may generate a display screen including various objects, such as icons, images, texts, and the like. Specifically, the GPU may calculate an attribute value, such as a coordinate value, a shape, a size, and a color of each object to be displayed according to a screen layout based on the received control command and generate display screens of the various layouts including objects based on the calculated attribute value.

The storage 220 may be embodied as a system-on-a-chip (SOC) or a system-on-chip (SoC) in combination with the various constituents described above.

Hereinafter, a controlling method of the electronic device 100 and the terminal device 200 according to the present disclosure will be described below.

Figure 8:
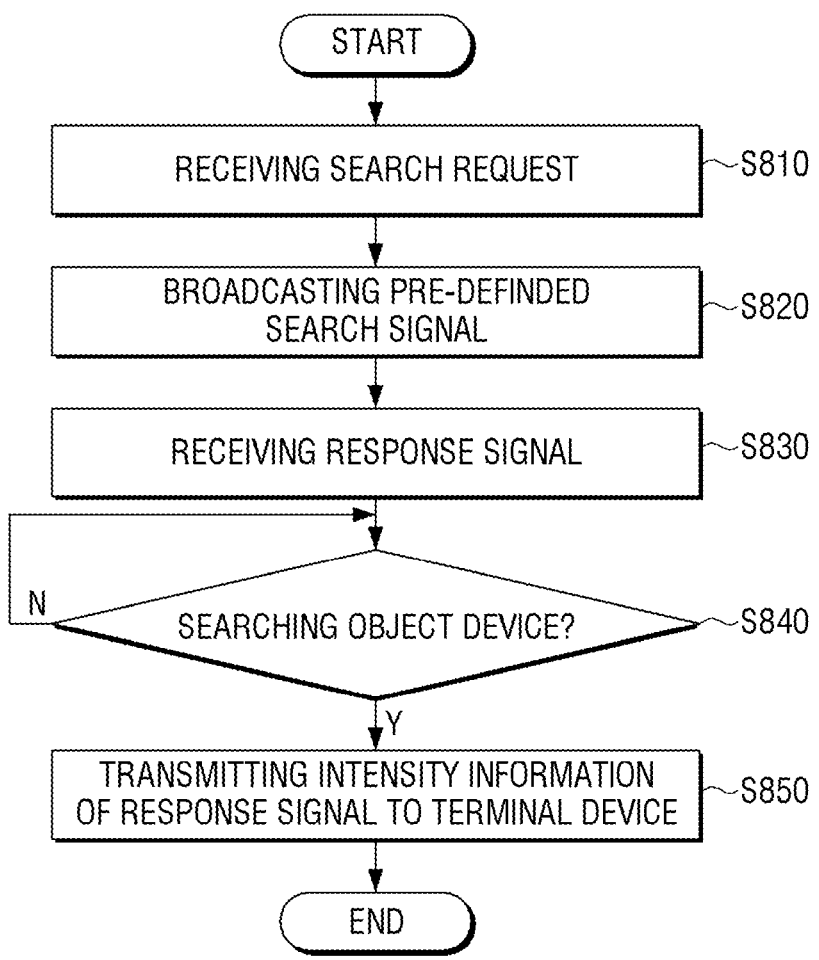
FIG. 8 is a flowchart illustrating a controlling method of an electronic device which searches a searching object device according to an embodiment of the present disclosure.

FIG. 8 is a flowchart illustrating a controlling method of an electronic device which searches a searching object device according to an embodiment of the present disclosure.

Referring to FIG. 8, the electronic device 100, in response to a search request for a searching object device being received from the paired terminal device 200, may broadcast the pre-defined search signal in response to the received search request at operation S810 and S820.

In response to a response signal being received from at least one of the plurality of external devices 300 in response to the broadcasted search signal, the electronic device 100 may analyze a pattern of the received response signal and determine whether at least one of the plurality of external devices 300 is a searching object device at operations S830 and S840.

As a result of determination, if at least one of the plurality of external devices 300 is a searching object device, the electronic device 100 may transmit intensity information of the response signal of the external device 300 determined as the searching object device to the terminal device 200 which transmits a search request at operation S850.

Accordingly, the terminal device 200 which transmits search requests to the plurality of electronic devices 100 may obtain the position information of the external device 300 determined as the searching object device based on the intensity information of the response signals received from the plurality of electronic devices 100.

The electronic device 100 may perform communication by using the first communication protocol, and the external device 300 determined as the searching object device may perform communication by using the second communication protocol different from the first communication protocol. The first and second communication protocols may have the same frequency band (e.g., a frequency band of 2.4 GHz).

At operation S820, the electronic device 100 may broadcast and transmit different signals depending on search requests.

According to an embodiment of the present disclosure, the electronic device 100 may broadcast the pre-stored search signal related to the second communication method in response to the search request with respect to the searching object device which performs communication by using the second communication protocol being received.

The plurality of external devices 300 may receive the broadcasted search signals and among the plurality of external devices 300 which receive the search signals, only the external device 300 which performs communication by using the second communication protocol may transmit the response signal with respect to the received search signal to the electronic device 100.

According to an embodiment of the present disclosure, the electronic device 100, in response to a search request including device type information of a searching object device which performs communication by using the second communication protocol being received, may broadcast the pre-stored search signal related to the device type information based on the search request.

Therefore, the plurality of external devices 300 may receive the broadcasted search signals, and among the plurality of external devices 300 which receive the search signals, only the external device 300 related to the device type information may transmit the response signal with respect to the received search signal to the electronic device 100.

According to an embodiment of the present disclosure, the electronic device 100, in response to a search request including device type information and identification information with respect to a searching object device which performs communication by using the second communication protocol being received, may broadcast the pre-stored search signal related to the device type information and the identification information based on the search request.

The plurality of external devices 300 may receive the broadcasted search signals and among the plurality of external devices 300 which receive the search signals, only the external device 300 related to the device type information and the identification information may transmit the response signal with respect to the received search signal to the electronic device 100.

Through such various embodiments of the present disclosure, in response to a response signal with respect to a search signal being received from at least one of the plurality of external devices 300 being received, the electronic device 100 may compare a pattern of the search signal transmitted in the broadcasting method with a pattern of the response signal received from the external device 300. As a result of comparison, the patterns of two signals correspond to each other, the electronic device 100 may determine the external device 300 which transmits the response signal as the searching object device and transmit the intensity information of the response signal of the external device 300 determined as the searching object device to the terminal device 200.

Therefore, the terminal device 200 may receive the intensity information of the response signal of the external device 300 determined as the searching object device from the plurality of electronic devices 100 which transmit search requests. In response to the intensity information of the response signal of the external device 300 determined as the searching object device being received from the plurality of electronic devices 100, the terminal device 200 may obtain the position information of the external device 300 determined as the searching object device by using at least three of the plurality of received intensity information.

Figure 9:
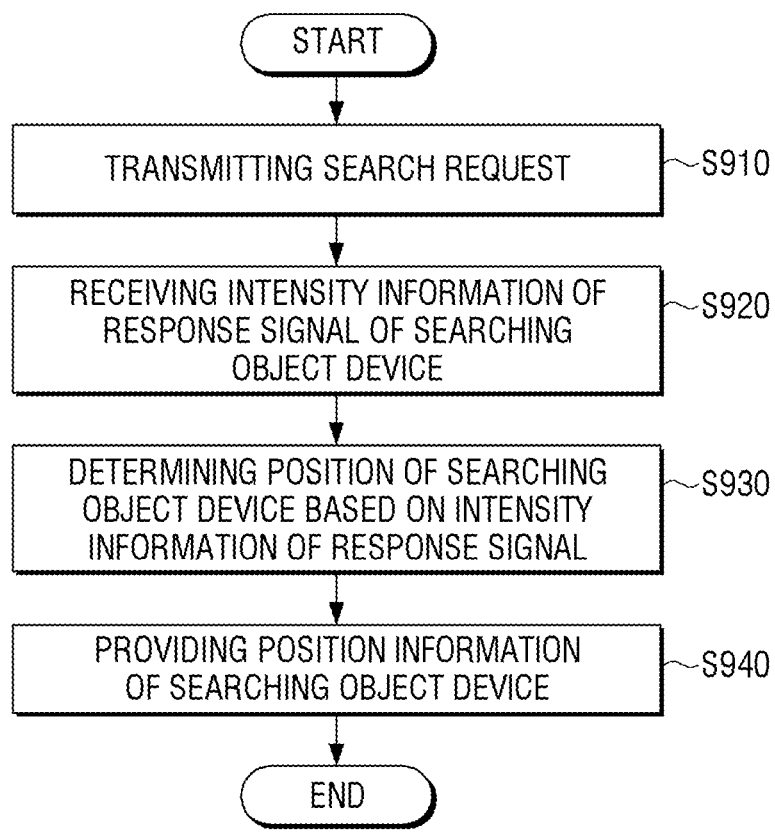
FIG. 9 is a flowchart illustrating a controlling method of a terminal device which provides position information of a searching object device according to an embodiment of the present disclosure.

FIG. 9 is a flowchart illustrating a controlling method of a terminal device which provides position information of a searching object device according to an embodiment of the present disclosure.

Referring to FIG. 9, the terminal device 200 may transmit search requests for a searching object device to the plurality of electronic devices 100, which are paired, according to a user command at operation S910.

The plurality of electronic devices 100 may perform communication by using the first communication protocol, and a searching object device may perform communication by using the second communication protocol different from the first communication protocol.

Specifically, the terminal device 200 may transmit search requests for a searching object device which performs communication by using the second communication protocol to the plurality of electronic devices 100 if the user command is a first search command.

If the user command is a second search command, the terminal device 200 may transmit search requests including device type information of the searching object device which performs communication by using the second communication protocol to the plurality of electronic devices 100.

If the user command is a third search command, the terminal device 200 may transmit search requests including device type information and identification information with respect to the searching object device which performs communication by using the second communication protocol to the plurality of electronic devices 100.

The terminal device 200 may receive the intensity information of the response signal of the searching object device from the plurality of electronic devices 100 which receive the search requests at operation S920. In response to the intensity information of the response signals of the searching object device being received from the plurality of electronic devices 100, the terminal device 200 may determine the position of the searching object device based on the received intensity information of the response signal and provide position information of the determined position at operations S930 and S940.

The terminal device 200 may be the user command (not shown), such as a smart phone. The terminal device 200 may display a device image of the external device 300 determined as the searching object device on the pre-stored map UI based on the position information of the external device 300 determined as the searching object device and display the device image on a screen.

The terminal device 200 according to the present disclosure may display the image of the area where the external device 300 determined as the searching object device is disposed on the screen. Hereinafter, a method of displaying the image of the area where the external device 300 determined as the searching object device is disposed on the screen will be described below.

Figure 10:
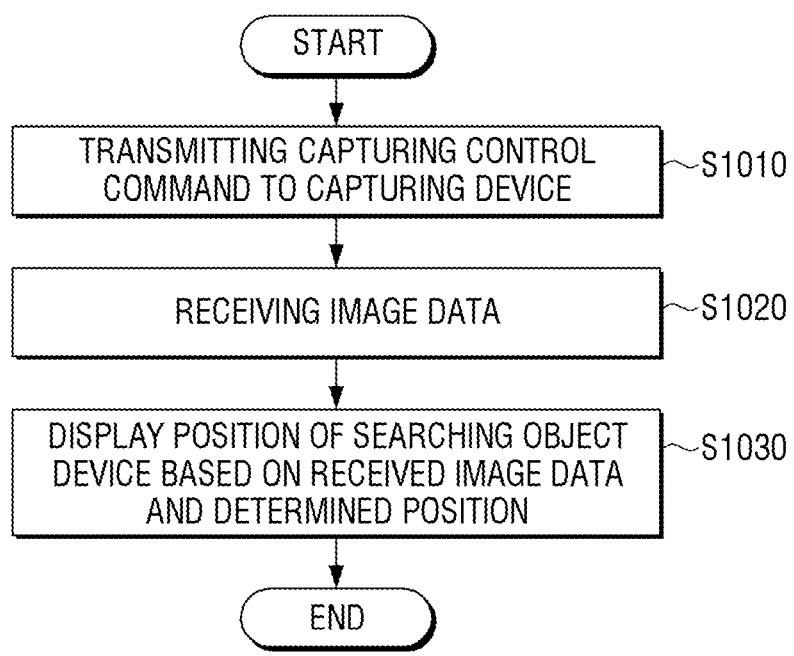
FIG. 10 is a flowchart illustrating a method of displaying a captured image of an area where an external device determined as a searching object device is disposed on a screen in a terminal device according to an embodiment of the present disclosure.

FIG. 10 is a flowchart illustrating a method of displaying a captured image of an area where an external device determined as a searching object device is disposed on a screen in a terminal device according to an embodiment of the present disclosure.

Referring to FIG. 10, in response to the position information of the external device 300 determined as the searching object device being obtained, the terminal device 200 may transmit a capturing control command to the capturing device 400 capable of image capturing of the area where the external device 300 is disposed by using the pre-stored position information of each of the plurality of capturing devices 400 and the pre-obtained position information of the external device 300 at operation S1010.

The capturing device 400 which receives the capturing control command may capture an image in accordance with the received capturing control command and transmit the captured image data to the terminal device 200. Accordingly, the terminal device 200 may receive image data captured by the capturing device 400 at operation S1020. In response to the image data being received, the terminal device 200 may display the image of the area where the external device 300 determined as the searching object device is disposed on the screen based on the received image data and the position information of the external device 300 determined as the searching object device at operation S1030.

However, the present disclosure is not limited thereto, but the terminal device 200 may periodically receive the image data captured by at least one capturing device 400. In response to the position information of the external device 300 determined as the searching object device being obtained, the terminal device 200 may obtain the image data of the area where the external device 300 determined as the searching object device is disposed based on the obtained position information. The terminal device 200 may display the image of the area where the external device 300 determined as the searching object device is disposed on the screen by using the obtained image data.

When receiving a user command for a search request for a searching object device from the user terminal (not shown), the terminal device 200 may transmit the position information of the external device 300 determined as the searching object device to the user terminal (not shown).

The user terminal (not shown) may display the device image of the external device 300 determined as the searching object device on the pre-stored map UI based on the position information received from the terminal device 200 for displaying.

The terminal device 200 may transmit the position information of the searching object device and the image data of the area where the external device 300 determined as the searching object device is disposed to the user terminal (not shown).

The user terminal (not shown) may display the image of the area where the external device 300 determined as the searching object device is disposed on the screen based on the received image data and position information.

Figure 11:
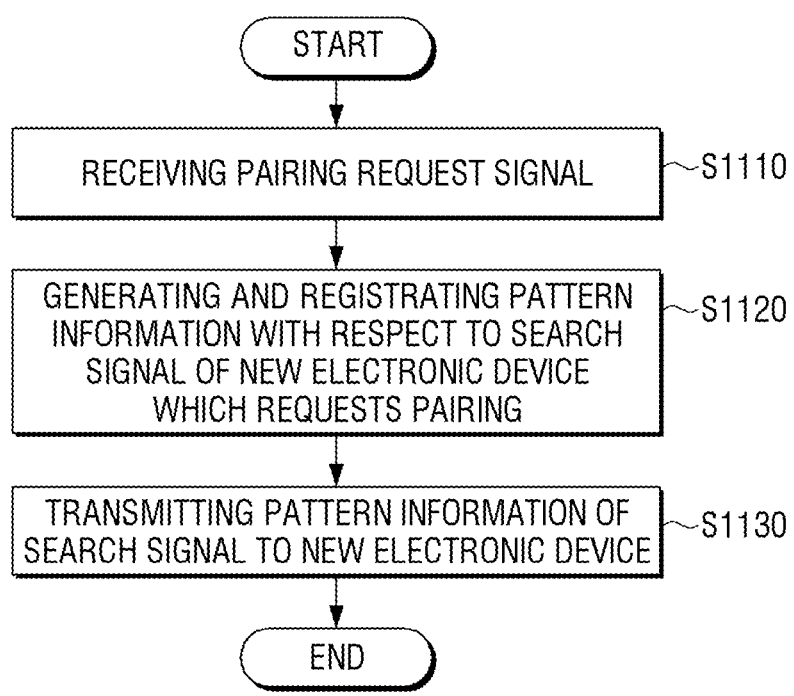
FIG. 11 is a flowchart illustrating a method of registering an unregistered Internet of things (JOT) device to a terminal device according to an embodiment of the present disclosure.

FIG. 11 is a flowchart illustrating a method of registering an unregistered IOT device to a terminal device according to an embodiment of the present disclosure.

Referring to FIG. 11, the terminal device 200, in response to a pairing request signal being received from an unregistered IOT device (hereinafter, referred to a new electronic device), may generate and store pattern information of a search signal of a new electronic device which requests pairing and register a new electronic device at operations S1110 and S1120. The terminal device 200 may transmit the pre-generated pattern information of the search signal of a new terminal device to the new terminal device based on the pairing request signal received from the new terminal device at operation S1130.

For example, the unregistered new electronic device may output a pairing request signal when an initial power source is turned on. Accordingly, the terminal device 200 may receive the pairing request signal output from the unregistered new electronic device. In response to the pairing request signal being received, the terminal device 200 may generate the pattern information with respect to the search signal of the new electronic device which requests pairing. The terminal device 200 may store device information including the pre-generated pattern information of the search signal of the new electronic device and perform registration of the new electronic device. The terminal device 200 may transmit registration information including the pre-generated pattern information with respect to the search signal of the new electronic device to the new electronic device based on the received pairing request signal.

Accordingly, the new electronic device may store the pattern information included in the registration information received from the terminal device 200. Through such the registration process, after the new electronic device is registered to the terminal device 200, in response to a search request for a searching object device being received from the terminal device 200, the new electronic device may generate a search signal from the pre-stored pattern information related to the received search request and transmit the generated search signal in the broadcasting method.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

According to an embodiment of the present disclosure, a process may be stored in a non-transitory readable medium in the form of a program, which is not a medium for storing data for a short period of time, such as register, cache, memory, or the like, but a medium for semi-permanently data. This means that the non-transitory readable medium is a medium read by a device. In particular, the various applications or programs described above may be stored on the non-transitory computer readable medium, such as a CD, a DVD, a hard disk, a Blu-ray disk, a (USB, a memory card, a ROM, or the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A controlling method of an electronic device storing a predetermined pattern corresponding to search request for a target device, the method comprising:
   receiving, from a terminal device, a search request for the target device;
   broadcasting a predetermined search signal, to an external device, based on the search request received from the terminal device;
   receiving, from the external device, an external device radio frequency (RF) response signal, which is transmitted by the external device in response to the predetermined search signal;
   in response to receiving the external device RF response signal from the external device, comparing a pattern included in the external device RF response signal with the stored predetermined pattern; and
   in response to identifying that the pattern included in the external device RF response signal corresponds to the predetermined pattern, identifying the external device as the target device and transmitting intensity information of the external device RF response signal to the terminal device that is based on a measurement of the external device RF response signal,
   wherein the terminal device identifies a position of the external device based on the intensity information of the external device RF response signal sensed by the electronic device.

2. The method of claim 1,
   wherein the electronic device performs communication by using a first communication protocol, and
   wherein the external device which is determined as the target device performs communication by using a second communication protocol different from the first communication protocol.

3. The method of claim 2,
   which performs communication by using the second communication protocol, the broadcasting of the predetermined search signal comprises broadcasting a pre-stored search signal related to the second communication protocol, and
   wherein the external device RF response signal is a signal received from the external device which performs communication by using the second communication protocol.

4. The method of claim 2,
   wherein the broadcasting of the predetermined search signal comprises, in response to receiving the search request including device type information of the target device which performs communication by using the second communication protocol, broadcasting a pre-stored search signal related to the device type information based on the search request, and
   wherein the external device RF response signal is a signal received from the external device related to the device type information, among external devices which perform communication by using the second communication protocol.

5. The method of claim 2,
   wherein the broadcasting of the predetermined search signal comprises, in response to receiving the search request including device type information and identification information of the target device which performs communication by using the second communication protocol, broadcasting a pre-stored search signal related to the device type information and the identification information based on the search request, and
   wherein the external device RF response signal is received from the external device related to the device type information and the identification information, among external devices which perform communication by using the second communication protocol.

6. The method of claim 2, wherein the first communication protocol and the second communication protocol use a same frequency band.

7. The method of claim 1, further comprising:
   receiving intensity information of a plurality of received RF response signals received from the external device which is determined as the target device from a plurality of electronic devices; and
   determining the position of the external device determined as the target device based on the intensity information of the plurality of received RF response signals.

8. A controlling method of a terminal device, the method comprising:
   transmitting a search request for a target device to a plurality of electronic devices, wherein, in response to the search request, an external device transmits an external device radio frequency (RF) response signal to the plurality of electronic devices and the plurality of electronic devices transmit intensity information of the external device RF response signal to the terminal device;
   receiving each of intensity information of the external device RF response signal from the plurality of electronic devices, wherein the intensity information of the external device RF response signal is measured by each of the plurality of electronic devices; and
   identifying a position of the external device based on each of the intensity information which are transmitted from each of the plurality of electronic devices.

9. The method of claim 8, further comprising:
   receiving image data of an area where the target device is disposed from at least one capturing device; and
   displaying the position of the target device based on the image data and the position.

10. The method of claim 8, further comprising:
    transmitting position information of the target device to an external user terminal,
    wherein the external user terminal displays the position of the target device based on the position information.

11. The method of claim 8,
wherein the plurality of electronic devices perform communication by using a first communication protocol,
wherein the target device performs communication by using a second communication protocol different from the first communication protocol, and
wherein the transmitting of the search request further comprises:
- transmitting the search request for the target device which performs communication by using the second communication protocol to the plurality of electronic devices in response to a first searching command,
- transmitting the search request including device type information for the target device which performs communication by using the second communication protocol to the plurality of electronic devices in response to a second searching command, and
- transmitting the search request including device type information and identification information for the target device which performs communication by using the second communication protocol to the plurality of electronic devices in response to a third searching command.

12. An electronic device storing a predetermined pattern corresponding to search request for a target device, the electronic device comprising:
a communicator; and
at least one processor configured to:
- control the communicator to receive, from a terminal device, a search request for the target device,
- control the communicator to broadcast a predetermined search signal, to an external device, based on the search request received from the terminal device,
- control the communicator to receive, from the external device, an external device radio frequency (RF) response signal, which is transmitted by the external device in response to the predetermined search signal,
- in response to receiving the external device RF response signal from the external device, compare a pattern included in the external device RF response signal with the stored predetermined pattern, and
- in response to identifying that the pattern included in the external device RF response signal corresponds to the predetermined pattern, identify the external device as the target device and transmit intensity information of the external device RF response signal to the terminal device that is based on a measurement of the external device RF response signal,
wherein the terminal device identifies a position of the external device based on the intensity information of the external device RF response signal sensed by the electronic device.

13. The electronic device of claim 12,
wherein the communicator is further configured to:
perform data communication with a paired terminal device by using a first communication protocol, and
transmit the predetermined search signal for the search request in a broadcasting method, and
wherein the external device, which is identified as the target device, is configured to perform communication by using a second communication protocol different from the first communication protocol.

14. The electronic device of claim 13,
wherein the at least one processor is further configured to control, in response to receiving the search request for the target device which performs communication by using the second communication protocol, the communicator to broadcast the predetermined search signal related to the second communication protocol, and
wherein the received RF response signal is a signal received from the external device which performs communication by using the second communication protocol.

15. The electronic device of claim 13,
wherein the at least one processor is further configured to control, in response to receiving the search request including device type information for the target device which performs communication by using the second communication protocol, the communicator to broadcast the predetermined search signal related to the device type information based on the search request, and
wherein the received RF response signal is a signal received from the external device related to the device type information, among external devices which perform communication by using the second communication protocol.

16. The electronic device of claim 13,
wherein the at least one processor is further configured to control, in response to receiving the search request including device type information and identification information for the target device which performs communication by using the second communication protocol, the communicator to broadcast the predetermined search signal related to the device type information and the identification information based on the search request, and
wherein the received RF response signal is a signal received from an external device related to the device type information and the identification information, among external devices which perform communication by using the second communication protocol.

17. The electronic device of claim 13, wherein the first communication protocol and the second communication protocol use a same frequency band.

* * * * *